United States Patent
Kim et al.

(10) Patent No.: US 7,336,476 B2
(45) Date of Patent: Feb. 26, 2008

(54) DIELECTRIC CERAMIC COMPOSITION FOR LOW TEMPERATURE SINTERING AND MULTILAYER CERAMIC CAPACITOR USING THE SAME

(75) Inventors: Chan Kong Kim, Kyungki-do (KR); Kang Heon Hur, Kyungki-do (KR); Eun Sang Na, Kyungki-do (KR); Sung Bum Sohn, Kyungki-do (KR); Tae Ho Song, Kyungki-do (KR); Han Seong Jung, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 3 days.

(21) Appl. No.: 11/493,671

(22) Filed: Jul. 27, 2006

(65) Prior Publication Data

US 2007/0025060 A1    Feb. 1, 2007

(30) Foreign Application Priority Data

Jul. 28, 2005   (KR) ............... 10-2005-0069035

(51) Int. Cl.
*H01G 4/12* (2006.01)
*C04B 35/468* (2006.01)

(52) U.S. Cl. .................. 361/321.4; 361/321.5; 501/139

(58) Field of Classification Search ........ 361/311, 361/321.1, 321.2, 321.3, 321, 321.5; 501/137–139
See application file for complete search history.

(56) References Cited

U.S. PATENT DOCUMENTS 7,262,146 B2 *  8/2007  Ito et al. ............... 501/139
2002/0013213 A1 *  1/2002  Sato et al. ............ 501/139
2004/0038800 A1 *  2/2004  Horie et al. .......... 501/139
2004/0106510 A1 *  6/2004  Kim et al. ............ 501/139
2005/0286208 A1 * 12/2005  Ito et al. ............ 361/321.5
2006/0046921 A1 *  3/2006  Ito et al. ............... 501/136
2006/0046922 A1 *  3/2006  Ito et al. ............... 501/138
2006/0223692 A1 * 10/2006  Ito et al. ............... 501/139
2006/0232911 A1 * 10/2006  Ito et al. ............ 361/321.4

FOREIGN PATENT DOCUMENTS

JP    2000-311828    11/2000

* cited by examiner

*Primary Examiner*—Eric Thomas
(74) *Attorney, Agent, or Firm*—McDermott Will & Emery LLP

(57) ABSTRACT

The invention relates to a dielectric ceramic composition, which can be sintered at a low temperature as well as achieve a high dielectric constant with excellent thermal stability, and a multilayer ceramic capacitor using the same. The dielectric ceramic composition comprises a main component of $(Ba_{1-x}Ca_x)_mTiO_3$; and sub-components including $MgCO_3$, $RE_2O_3$, MO, MnO, $V_2O_5$, $Cr_2O_3$ and a sintering additive of $SiO_2$. $RE_2O_3$ is at least one selected from the rare earth oxide group consisting of $Y_2O_3$, $Dy_2O_3$ and $Ho_2O_3$, and MO is one of Ba and Ca. The dielectric ceramic composition is expressed by a following formula: $a(Ba_{1-x}Ca_x)_mTiO_3$-$bMgCO_3$-$cRE_2O_3$-$dMO$-$eMnO$-$fSiO_2$-$gV_2O_5$-$hCr_2O_3$. Here, a, b, c, d, e, f, g, and h satisfy following relationships: in mole fraction, $a=100$, $0.1 \leq b \leq 3.0$, $0.1 \leq c \leq 3.0$, $0.1 \leq d \leq 3.0$, $0.05 \leq e \leq 1.0$, $0.2 \leq f \leq 3.0$, $0.01 \leq g \leq 1.0$, and $0.01 \leq h \leq 1.0$, and x and m satisfy following relationships: $0.005 \leq x \leq 0.15$, and $0.995 \leq m \leq 1.03$.

12 Claims, 2 Drawing Sheets

DIELECTRIC CERAMIC COMPOSITION FOR LOW TEMPERATURE SINTERING AND MULTILAYER CERAMIC CAPACITOR USING THE SAME

CLAIM OF PRIORITY

This application claims the benefit of Korean Patent Application No. 2005-69035 filed on Jul. 28, 2005, in the Korean Intellectual Property Office, the disclosure of which is incorporated herein by reference.

BACKGROUND OF THE INVENTION

1. Field of the Invention

The present invention relates to a dielectric ceramic composition and a multilayer ceramic capacitor using the same, and more particularly, to a dielectric ceramic composition, which can be sintered at a low temperature as well as achieve a high dielectric constant with excellent thermal stability, and a multilayer ceramic capacitor using the same.

2. Description of the Related Art

Recently, along with rapid development of electric and electronic appliances focused on miniaturization, light weight, high performance and so on, multilayer ceramic capacitors used therein are also facing demands for smaller size and larger capacitance. To achieve smaller size and larger capacitance, dielectric layers of such a multilayer ceramic capacitor are getting thinner. At present, a dielectric layer having a thickness of 3 µm or less is also demanded. Producing thinner dielectric layers needs dielectric powder and accessory additives where grain growth can be suppressed in sintering. Furthermore, thinner dielectric layers can be produced more easily when dielectric constant is higher compared to particle size of sintering material.

To produce a multilayer ceramic capacitor using thin dielectric layers, it is necessary to employ a dielectric composition sinterable at a temperature not exceeding 1,200° C. When a dielectric composition is sintered at a high temperature of 1,300° C. or more, internal electrodes tend to conglomerate, thereby lowering the capacitance of a ceramic capacitor while raising short-circuit ratio. Producing thin dielectric layers and stacking them by a greater number to obtain a high capacitance may give severe adverse influences to capacitance change at high temperature (thermal stability of capacitance).

Japanese Patent Application Publication No. 2000-311828 discloses a dielectric ceramic composition for a multilayer ceramic capacitor satisfying X5R and X7R characteristics. The dielectric ceramic composition proposed in this document contains a main component of $BaTiO_3$ and sub-components such as $Cr_2O_3$. A multilayer ceramic capacitor produced using the dielectric magnetic composition has advantages such as small aging rate of capacitance and long accelerated life of Insulation Resistance (IR). However, the dielectric composition disclosed in this document has a sintering temperature of up to 1,270° C., and thus is hardly applicable to produce ultra thin dielectric layers of a multilayer ceramic capacitor.

SUMMARY OF THE INVENTION

The present invention has been made to solve the foregoing problems of the prior art and therefore an object of certain embodiments of the present invention is to provide a dielectric ceramic composition which can be sintered at a low temperature not exceeding 1,200° C., achieve a high dielectric constant with excellent thermal stability, and be applied to the formation of a dielectric layer having at thickness of 3 µm or less.

Another object of certain embodiments of the present invention is to provide a multilayer ceramic capacitor using the same.

According to an aspect of the invention for realizing an object of the invention, there is provided a dielectric ceramic composition comprising: a main component of $(Ba_{1-x}Ca_x)_m TiO_3$; and sub-components of $MgCO_3$, $RE_2O_3$, MO, MnO, $V_2O_5$, $Cr_2O_3$ and a sintering additive of $SiO_2$, where $RE_2O_3$ is at least one selected from the rare earth oxide group consisting of $Y_2O_3$, $Dy_2O_3$ and $Ho_2O_3$, and MO is one of Ba and Ca, wherein the dielectric ceramic composition is expressed by a following formula: $a(Ba_{1-x}Ca_x)_m TiO_3$-$bMgCO_3$-$cRE_2O_3$-$dMO$-$eMnO$-$fSiO_2$-$gV_2O_5$-$hCr_2O_3$, where a, b, c, d, e, f, g, and h satisfy following relationships: in mole fraction, a=100, $0.1 \leq b \leq 3.0$, $0.1 \leq c \leq 3.0$, $0.1 \leq d \leq 3.0$, $0.05 \leq e \leq 1.0$, $0.2 \leq f \leq 3.0$, $0.01 \leq g \leq 1.0$, and $0.01 \leq h \leq 1.0$, and x and m satisfy following relationships: $0.005 \leq x \leq 0.15$, and $0.995 \leq m \leq 1.03$.

According to a preferred embodiment of the invention, the $(Ba_{1-x}Ca_x)_m TiO_3$ component is provided by $(Ba_{1-x}Ca_x)_m TiO_3$ powder having a mean particle size ranging from 150 nm to 400 nm. The $(Ba_{1-x}Ca_x)_m TiO_3$ component may be provided by $(Ba_{1-x}Ca_x)_m TiO_3$ powder produced by at least one selected from the group consisting of solid state mixing, hydrothermal synthesis and sol-gel method. Preferably, m added with d is larger than 1.00 and smaller than 1.03.

According to another preferred embodiment of the invention, the $SiO_2$ component may is provided by $SiO_2$ powder. Alternatively, the $SiO_2$ component may be provided by $SiO_2$ sol or Si alkoxide.

According to an aspect of the invention for realizing another object of the invention, there is provided multilayer ceramic capacitor comprising a capacitor body having dielectric layers and internal electrodes alternating with the dielectric layers, wherein each of the dielectric layers comprises the above-mentioned dielectric ceramic composition of the invention.

According to a preferred embodiment of the invention, the internal electrodes may contain a conductor of Ni or Ni alloy.

According to another preferred embodiment of the invention, the dielectric layers may include at least 400 layers stacked one atop another. The dielectric layers may have a thickness of 3 µm or less, and preferably, of 0.5 µm to 3 µm. In addition, the $(Ba_{1-x}Ca_x)_m TiO_3$ component of the dielectric layers may have a mean particle size ranging from 150 nm to 400 nm.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 1:
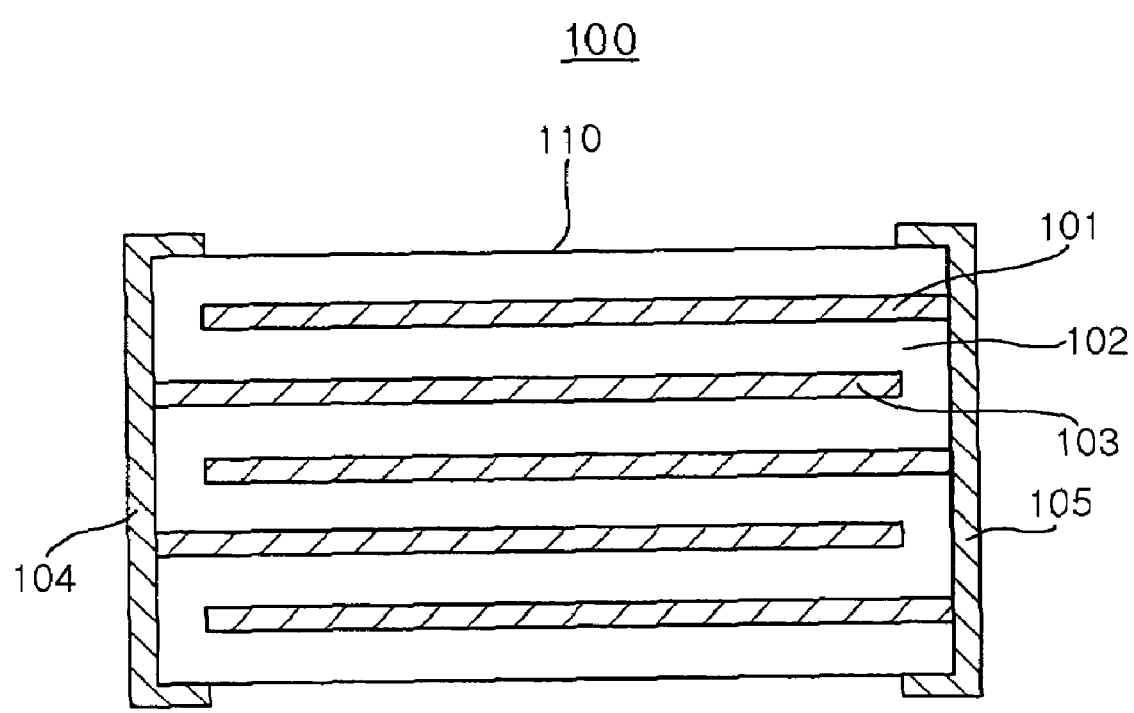
FIG. 1 is a cross-sectional view illustrating a multilayer ceramic capacitor according to an embodiment of the invention.

The present invention will now be described more fully hereinafter.

Dielectric Ceramic Composition

The dielectric ceramic composition of certain embodiments of the invention shows X5R characteristics defined by the Electronic Industries Alliance (EIA) standard (capacitance change $\Delta C$ at a temperature ranging from $-55°$ C. to $85°$ C. is $\pm 15\%$ or less with a reference temperature of $25°$ C.). With this dielectric ceramic composition, dielectric grain growth does not take placed even after sintering, such that a thin dielectric sheet having a thickness of 1 µm or less can be easily produced. Accordingly, excellent reliability characteristics such as high temperature Insulation Resistance (IR) can be ensured.

$(Ba_{1-x}Ca_x)_mTiO_3$ is a main component of the dielectric ceramic composition, in which Ca atoms substitute some Ba atoms of $BaTiO_3$ to form oxygen vacancies, thereby imparting reduction resistance to $(Ba_{1-x}Ca_x)_mTiO_3$. Thus, a core-shell structure is not formed even after sintering, or even if a thin shell is formed, the dielectric ceramic composition still shows a high IR. The main component of $(Ba_{1-x}Ca_x)_mTiO_3$ can be provided in the form of $(Ba_{1-x}Ca_x)_mTiO_3$ powder.

The amount of Ca (x) substituted in $(Ba_{1-x}Ca_x)_mTiO_3$ is in the range from 0.005 mole to 0.15 mole per 1 mole (i.e., 0.5 to 15 mole %). A Ca substitution smaller than 0.5 mole % shortens mean lifetime, whereas a Ca substitution exceeding 15 mole % degrades sinterability and drops dielectric constant. The sign m (Ba/Ti ratio) is preferably larger than 0.995 but smaller than 1.03. When m is less than 0.995, resistivity decreases. When m is 1.02 or more, sinterability becomes bad, and resistivity is lowered. When m is larger than 1.03, sinterability becomes worse, and thus mean lifetime lowers.

It is advantageous that the main component of $(Ba_{1-x}Ca_x)_mTiO_3$ has a small particle size ranging from 150 nm to 400 nm. A large $(Ba_{1-x}Ca_x)_mTiO_3$ particle size increases dielectric constant but shortens mean lifetime. On the other hand, a too small $(Ba_{1-x}Ca_x)_mTiO_3$ particle size decreases dielectric constant. The $(Ba_{1-x}Ca_x)_mTiO_3$ powder in the invention may be produced by a typical solid state reaction using $BaCo_3$ or $TiO_3$ as a starting material, a hydrothermal synthesis using $Ba(OH)_2$ or $Ti(OH)_4$ as an intermediate material, or a sol-gel method.

Of sub-components added to $(Ba_{1-x}Ca_x)_mTiO_3$, $MgCO_3$ acts to suppress grain growth. At a $MgCo_3$ content less than 0.1 mole per 100 mole of $(Ba_{1-x}Ca_x)_mTiO_3$, grain growth stability drops to lower resistivity and temperature characteristics do not satisfy X5R characteristics. A $MgCo_3$ content exceeding 3.0 mole raises sintering temperature and shortens lifetime. The $MgCo_3$ sub-component to be added may be obtained from oxides or $NO_3$ salts.

Rare earth compound or rare earth oxide of the sub-components serves to increase mean lifetime. A content of rare earth compound less than 0.1 mole per 100 mole of $(Ba_{1-x}Ca_x)_mTiO_3$ shortens mean lifetime at a high temperature. On the other hand, when the content of rare earth compound is larger than 3.0 mode, TCC is more stabilized but sinterability degrades. This causes sintering temperature to rise up to $1,300°$ C. or more, thereby shortening mean lifetime to the contrary. The rare earth compound may adopt one of $Y_2O_3$, $Dy_2O_3$ and $Ho_2O_3$ and combinations thereof.

MnO of the sub-components serves to increase room temperature and high temperature IR of $(Ba_{1-x}Ca_x)_mTiO_3$ powder in a reducing atmosphere. A MnO content less than 0.05 mole increases resistivity. A MnO content is 1.0 mole or more increases aging rate of capacitance according to time as well as capacitance change with DC bias applied continuously.

MO (M is Ba or Ca) of the sub-components can be produced from carbonate such as $BaCO_3$ and $CaCO_3$, nitrate such as $NO_3$, or any material which generates Ba or Ca oxide when heat treated. The content of MO added into the dielectric ceramic composition is related with m of $(Ba_{1-x}Ca_x)_mTiO_3$ powder. When the MO content is too small, grain growth cannot be efficiently suppressed. On the other hand, MO added at an excessive amount degrades sinterability. The MO content d is in the range from 0.1 to 3.0 mole per 100 mole of $(Ba_{1-x}Ca_x)_mTiO_3$, and m+d is preferably larger than 1.00 but smaller than 1.03.

$SiO_2$ of the sub-components serves as a sintering additive to drop sintering temperature. The $SiO_2$ component is added preferably in the form of $SiO_2$ powder. The $SiO_2$ component may be added also in the form of $SiO_2$ sol or Si alkoxide compound. A $SiO_2$ content smaller than 0.2 mole per 100 mole of $(Ba_{1-x}Ca_x)_mTiO_3$ degrades sinterability and thus drops IR, which shortens mean lifetime. An excessive amount of $SiO_2$ content of 3.0 mole or more decreases dielectric constant and drops IR. The $SiO_2$ content is preferably in the range from 0.2 to 3.0 mole.

Since a conventional sintering additive adopts a mixed calcined material such as $(Ba, Ca)_xSiO_{2+x}$, where x=0.8 to 1.2, an additional process of preparing the sintering additive is necessary. In addition, the conventional sintering additive of calcined material tends to grow into coarse particles. Therefore, when used as a sintering additive for the fabrication of a multilayer ceramic capacitor having thin dielectric sheets, the conventional $(Ba, Ca)_xSiO_{2+x}$ sintering additive may degrade reliability. However, since the invention adopts $SiO_2$ as a sintering additive, an additional process of preparing the sintering additive is not necessary. $SiO_2$ mixed at a suitable ratio with other sub-components can act as a sintering additive to enable low temperature sintering.

$V_2O_4$ of the sub-components does not influence to dielectric constant but segregates in grain boundaries to suppress abnormal grain growth of the main component of $(Ba_{1-x}Ca_x)_mTiO_3$ powder. $V_2O_4$ also substitutes Ba of $(Ba, Ca)_xSiO_{2+x}$ to control mobility of oxygen vacancies, thereby improving sinterability, IR, breakdown voltage and mean lifetime. The content of $V_2O_4$ suitably does not exceed 1.0 mole per 100 mole of $(Ba_{1-x}Ca_x)_mTiO_3$. When added at an excessive amount, $V_2O_4$ decreases IR to the contrary.

$Cr_2O_3$ generally segregates in grain boundaries, thereby suppressing abnormal grain growth of $(Ba_{1-x}Ca_x)_mTiO_3$ powder as well as dropping sintering temperature a little. $Cr_2O_3$ also improves dielectric constant, insulation breakdown voltage and mean lifetime. A $Cr_2O_3$ content is suitably 1.0 more or less per 100 mole of $(Ba_{1-x}Ca_x)_mTiO_3$. When added excessively, $Cr_2O_3$ lowers mean lifetime.

The dielectric ceramic composition comprising the above-mentioned components is a composition having reduction resistance. Therefore, such dielectric ceramic composition can be availably employed as dielectric material of a multilayer ceramic capacitor having internal electrodes of Ni or Ni alloy. Furthermore, as described hereinafter, the dielectric ceramic composition can be sintered at a low temperature ranging from $1,150°$ C. to $1,200°$ C. while providing a high dielectric constant of 3,000 or more. Moreover, since the dielectric ceramic composition can suppress grain growth, dielectric constant changes little according to temperature, which results in excellent thermal stability. The dielectric ceramic composition is readily applicable to an ultra thin dielectric sheet having a thickness of 3 μm or less, and thus suitable for the fabrication of an ultra thin multilayer ceramic capacitor having a high capacitance.

Multilayer Ceramic Capacitor

FIG. 1 is a cross-sectional view illustrating a multilayer ceramic capacitor 100 according to an embodiment of the invention. Referring to FIG. 1, the multilayer ceramic capacitor 100 has a capacitor body 110 with dielectric layers 102 layered alternately with internal electrodes 101 and 103. External electrodes 104 and 105 are formed on the outer surface of the capacitor body 110, and electrically connected to corresponding internal electrodes 103 and 101, respectively.

Each of the dielectric layers 102 comprises a dielectric ceramic composition as stated above. That is, the dielectric layer 102 comprises a main component of $(Ba_{1-x}Ca_x)_mTiO_3$ and sub-components of $MgCO_3$, $RE_2O_3$, $MO$, $MnO$, $V_2O_5$; $Cr_2O_3$ and a sintering additive of $SiO_2$, where $RE_2O_3$ is at least one rare earth oxide selected from the group consisting of $Y_2O_3$, $Dy_2O_3$ and $Ho_2O_3$, $MO$ is one of $Ba$ and $Ca$. Here, the composition of the dielectric layer is expressed by a formula: $a(Ba_{1-x}Ca_x)_mTiO_3$-$bMgCO_3$-$cRE_2O_3$-$dMO$-$eMnO$-$fSiO_2$-$gV_2O_5$-$hCr_2O_3$, where a, b, c, d, e, f, g, and h satisfy following relationships: in mole fraction, a=100, $0.1 \leq b \leq 3.0$, $0.1 \leq c \leq 3.0$, $0.1 \leq d \leq 3.0$, $0.05 \leq e \leq 1.0$, $0.2 \leq f \leq 3.0$, $0.01 \leq g \leq 1.0$, and $0.01 \leq h \leq 1.0$, and x and m satisfy following relationships: $0.005 \leq x \leq 0.15$, and $0.995 \leq m \leq 1.03$.

The thickness of the dielectric layer 102 is not specifically limited, but may be 3 μm or less per layer in order to produce an ultra-thin capacitor having a high capacitance. Preferably, the dielectric layer 102 may have a thickness ranging from 0.5 μm to 3 μm.

The number of the dielectric layer 102 stacked one atop another is not specifically limited, but preferably is 400 or more in order to a high capacitance capacitor. More preferably, the dielectric layers 102 may include 400 to 1,000 layers stacked one atop another.

Preferably, $(Ba_{1-x}Ca_x)_mTiO_3$ dielectric particles contained in the dielectric layer 102 has a mean size ranging from 150 nm to 400 nm. When the mean size of the $(Ba_{1-x}Ca_x)_mTiO_3$ dielectric particles is too large, lifetime is shortened even with dielectric constant raised. When the mean size of the $(Ba_{1-x}Ca_x)_mTiO_3$ dielectric particles is too small, dielectric constant is lowered.

The conductor of the internal electrodes 101 and 103 is not specifically limited. However, since the dielectric layer 102 is reduction resistant, it is preferable to adopt Ni or Ni alloy for the internal electrodes 101 and 103. Cu or Ni may be used for the external electrodes 104 and 105.

The multilayer ceramic capacitor 100 may be fabricated by a process similar to that of conventional ceramic capacitors, which includes slurry preparation, green sheet forming, internal electrode printing, stacking, compression, sintering and so on.

Figure 2:
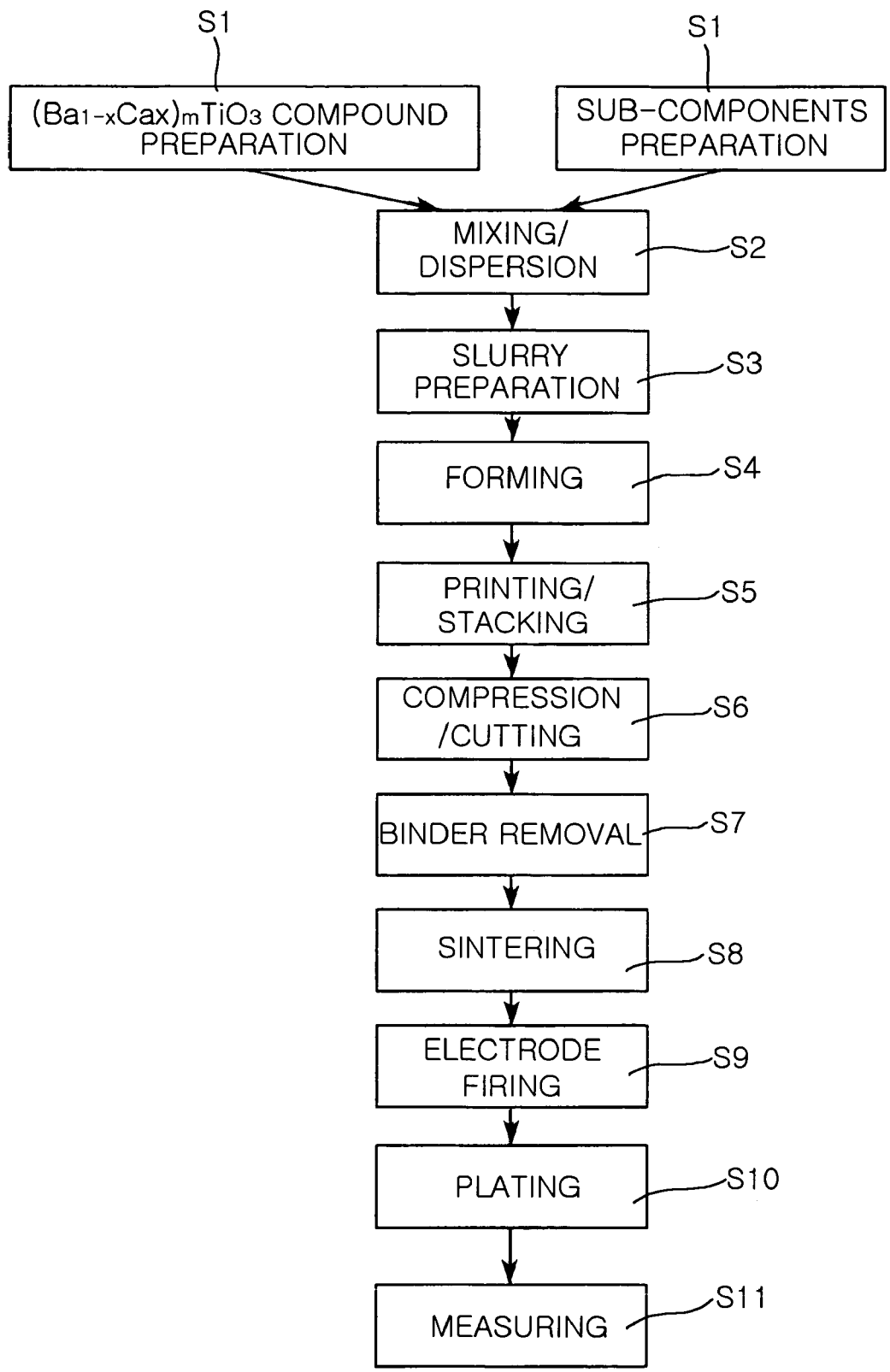
FIG. 2 is a flowchart illustrating a process of fabricating a multilayer ceramic capacitor according to an embodiment of the invention.

Hereinafter the process for fabricating a multilayer ceramic capacitor according to an embodiment of the invention will be described with reference to FIG. 2. First, in steps S1 and S1', $(Ba_{1-x}Ca_x)_mTiO_3$, $MgCO_3$, $RE_2O_3$, $MO$, $MnO$, $V_2O_5$ and $Cr_2O_3$ powders and $SiO_2$ sintering additive are prepared, respectively, by weighing them to satisfy the above-mentioned contents. The prepared substances are dispersed into water or alcohol, where they are wet mixed, and a resultant mixture is dried at a temperature ranging from 150° C. to 200° C. in step S2. The dried powder mixture is mixed with an organic binder and a solvent to prepare a slurry in step S3. For example, the organic binder may adopt polyvinyl butyral, the solvent may adopt acetone or toluene.

Then, the slurry is formed into sheets (green sheets) in step S4. For example, internal electrodes of for example Ni are printed on the formed green sheets, which are then stacked one atop another in step S5. A resultant stack is compressed and diced into separate chips (green chips) in step S6. Then, in step S7, the green chips are heated at a temperature ranging from 250° C. to 350° C. to remove the binder or dispersing agent from the chips.

After the binder removing step, the stacks are sintered (fired) at a temperature for example ranging from 1,150° C. to 1,200° C. in step S8. Then, in step S9, a paste for external electrodes such as Cu or Ni is applied onto the outer surface of the sintered structure and fired to form external electrodes. Optionally, a coat may be formed on the external electrodes via plating in step S10. As a result, multilayer ceramic capacitors 100 as shown in FIG. 1 are produced. Then, several properties of the produced multilayer ceramic capacitors are measured to evaluate the qualities of the multilayer ceramic capacitors in step S11.

While the above-mentioned process prepares slurry by wet mixing $(Ba_{1-x}Ca_x)_mTiO_3$ powder and sub-component powders before drying them, it is also possible to prepare slurry by weighing $(Ba_{1-x}Ca_x)_mTiO_3$ powder and sub-component powders, respectively, and mixing them directly with an organic solution and a binder with additional wet mixing omitted. (That is, step S2 may be omitted.)

The inventors have carried out various experiments to observe that multiplayer ceramic capacitors produced using the above-mentioned dielectric ceramic composition satisfy X5R characteristics, have excellent electric characteristics (e.g., IR characteristics, dielectric loss and so on), and show high average lifetime.

EXAMPLES

Now the present invention will be described in more detail with reference to following Examples, which are illustrative but not limiting the invention.

First, eight (8) $(Ba_{1-x}Ca_x)_mTiO_3$ powder types (A to H) were prepared according to the contents (x and m values) as reported in Table 1 below. As seen in Table 1 below, $(Ba_{1-x}Ca_x)_mTiO_3$ powders A to D have x and m values which are out of the $(Ba_{1-x}Ca_x)_mTiO_3$ content range of the invention. $(Ba_{1-x}Ca_x)_mTiO_3$ powders E to H are in the range of the invention, in which $(Ba_{1-x}Ca_x)_mTiO_3$ powder G has a mean particle size exceeding 150 nm and $(Ba_{1-x}Ca_x)_mTiO_3$ powder H has a particle size smaller than 400 nm.

TABLE 1

| $(Ba_{1-x}Ca_x)_mTiO_3$ powder (BT powder) | x | m | Mean particle size (nm) |
|---|---|---|---|
| A | 0.003 | 1.005 | 300 |
| B | 0.20 | 1.005 | 300 |
| C | 0.02 | 1.035 | 300 |
| D | 0.02 | 0.990 | 300 |
| E | 0.02 | 1.005 | 300 |
| F | 0.02 | 1.007 | 300 |
| G | 0.02 | 1.005 | 100 |
| H | 0.02 | 1.005 | 500 |

To fabricate various multilayer ceramic capacitors samples 1 to 29, the above-prepared 8 types of $(Ba_{1-x}Ca_x)_mTiO_3$ powders (BT powders) and sub-component powders of $MgCO_3$, $RE_2O_3$, MO, MnO, $V_2O_5$, $Cr_2O_3$ and $SiO_2$ are weighed according to the contents as reported in Table 2 below. In Table 2, the mole ratios b to h of the individual sub-components are expressed on the basis of 100 mole of the main component $(Ba_{1-x}Ca_x)_mTiO_3$ (BT 100 mole).

To evaluate electrical characteristics of the individual multilayer ceramic capacitor samples 1 to 29, capacitance, dielectric loss or failure (DF), IR and Temperature Coefficient of Capacitance (TCC) were measured therefrom. The capacitance and DF were measured at 1 kHz and 1 Vrms,

TABLE 2

| Sample No | BT | $MgCO_3$ MR (b) | $RE_2O_3$ RE | MR (c) | MO M | MR (d) | MnO MR (e) | $SiO_2$ MR (f) | $V_2O_5$ MR (g) | $Cr_2O_3$ MR (h) |
|---|---|---|---|---|---|---|---|---|---|---|
| 1 | A | 1.4 | Y | 1.0 | Ba | 1.0 | 0.1 | 1.5 | 0.02 | 0.1 |
| 2 | B | 1.4 | Y | 1.0 | Ba | 1.0 | 0.1 | 1.5 | 0.02 | 0.1 |
| 3 | C | 1.4 | Y | 1.0 | Ba | 1.0 | 0.1 | 1.5 | 0.02 | 0.1 |
| 4 | D | 1.4 | Y | 1.0 | Ba | 1.0 | 0.1 | 1.5 | 0.02 | 0.1 |
| 5 | E | 1.4 | Y | 1.0 | Ba | 1.0 | 0.1 | 1.5 | 0.02 | 0.1 |
| 6 | F | 1.4 | Y | 1.0 | Ba | 1.0 | 0.1 | 1.5 | 0.02 | 0.1 |
| 7 | E | 1.4 | Dy | 1.0 | Ba | 1.0 | 0.1 | 1.5 | 0.02 | 0.1 |
| 8 | F | 1.4 | Dy | 1.0 | Ba | 1.0 | 0.1 | 1.5 | 0.02 | 0.1 |
| 9 | E | 1.4 | Ho | 1.0 | Ba | 1.0 | 0.1 | 1.5 | 0.02 | 0.1 |
| 10 | F | 1.4 | Ho | 1.0 | Ba | 1.0 | 0.1 | 1.5 | 0.02 | 0.1 |
| 11 | E | 0.75 | Y | 0.6 | Ca | 0.5 | 0.1 | 1.5 | 0.02 | 0.1 |
| 12 | E | 0.75 | Y | 0.8 | Ba | 0.5 | 0.2 | 1.3 | 0.02 | 0.1 |
| 13 | E | 0.75 | Y | 0.5 | Ba | 0.6 | 0.2 | 1.0 | 0.02 | 0.1 |
| 14 | G | 1.4 | Y | 1.2 | Ba | 1.0 | 0.1 | 1.5 | 0.02 | 0.1 |
| 15 | H | 1.4 | Y | 1.2 | Ba | 1.0 | 0.1 | 1.5 | 0.02 | 0.1 |
| 16 | E | 0.05 | Y | 1.2 | Ba | 2.0 | 0.1 | 1.5 | 0.02 | 0.1 |
| 17 | E | 3.5 | Y | 1.2 | Ba | 1.0 | 0.1 | 1.5 | 0.02 | 0.1 |
| 18 | E | 1.8 | Y | 0.05 | Ba | 2.0 | 0.1 | 1.5 | 0.02 | 0.1 |
| 19 | E | 1.8 | Y | 3.5 | Ba | 1.0 | 0.1 | 1.5 | 0.02 | 0.1 |
| 20 | E | 1.0 | Y | 1.3 | Ba | 0.05 | 0.1 | 1.5 | 0.02 | 0.1 |
| 21 | E | 1.0 | Y | 1.3 | Ba | 3.5 | 0.1 | 1.5 | 0.02 | 0.1 |
| 22 | E | 1.0 | Y | 1.3 | Ba | 1.0 | 0.02 | 1.5 | 0.02 | 0.1 |
| 23 | E | 1.0 | Y | 1.3 | Ba | 1.0 | 1.5 | 1.5 | 0.02 | 0.1 |
| 24 | E | 1.0 | Y | 1.3 | Ba | 1.0 | 0.1 | 0.1 | 0.02 | 0.1 |
| 25 | E | 1.0 | Y | 1.3 | Ba | 1.0 | 0.1 | 3.5 | 0.02 | 0.1 |
| 26 | E | 1.0 | Y | 1.3 | Ba | 1.0 | 0.1 | 1.5 | 0.00 | 0.1 |
| 27 | E | 1.0 | Y | 1.3 | Ba | 1.0 | 0.1 | 1.5 | 1.5 | 0.1 |
| 28 | E | 1.0 | Y | 1.3 | Ba | 1.0 | 0.1 | 1.5 | 0.02 | 0 |
| 29 | E | 1.0 | Y | 1.3 | Ba | 1.0 | 0.1 | 1.5 | 0.02 | 1.5 |

Note)
MR: Mole Ratio

Then, multilayer ceramic capacitors were fabricated from the dielectric powder mixtures which were produced by weighing according to Table 2 above.

Describing in more detail, slurries were prepared from the individual dielectric powder mixtures, and green sheets with a thickness 3 μm or less were formed from the slurry. Internal electrodes of Ni were printed on the green sheets, which were then stacked one atop another up to on the order of 470 layers. Then, resultant stacks were compressed and diced into green chips, which were treated at a temperature ranging from 250° C. to 350° C. to remove the binder. After the binder was removed, the stacks were sintered at a temperature ranging from 1,180° C. to 1,200° C., where oxygen partial pressure was in the range of $10^{-11}$, to $10^{-12}$. After the sintering was finished, Cu paste for external electrodes was applied onto the sintered chips and fired at a temperature ranging from 850° C. to 920° C. to form external electrodes. Then, plating was performed to produce multilayer ceramic capacitor samples 1 to 29.

TCC was measured on the basis of the temperature dependency of dielectric constant ranging from −55° C. to 85° C. (reference temperature 25° C.). Dielectric constant was calculated according to the measured capacitance and the thickness of the dielectric layer. In addition, the individual capacitor samples were subjected to high temperature load test, in which a DC voltage of 18.9 V was applied to the individual capacitor samples at a temperature of 150° C. to measure the aging rate of IR. In the high temperature load test, mean lifetimes were determined by setting an IR of each sample at 105 Ω or less as failure.

Results of electrical characteristics evaluation with respect to the capacitor samples are as reported in Table 3 below, where sintering temperature, electrical characteristics (dielectric characteristics), sintering characteristics and so on are recorded.

TABLE 3

| Sample No. | ST (° C.) | DC | DF (%) | TCC (85° C.) (%) | IR (×$10^8$ Ω) | ML (h) | Remarks |
|---|---|---|---|---|---|---|---|
| 1 | 1180 | 2800 | 5.5 | −16 | 7.5 | — | TCC is out of X5R characteristics |
| 2 | 1180 | 2000 | 9.0 | −11 | 0.01 | — | Not sintered |
| 3 | 1200 | 1800 | 12 | −11 | 0.05 | — | Not sintered |

TABLE 3-continued

| Sample No. | ST (° C.) | DC | DF (%) | TCC (85° C.) (%) | IR (×10⁸ Ω) | ML (h) | Remarks |
|---|---|---|---|---|---|---|---|
| 4 | 1200 | 2900 | 9.5 | −17 | 0.1 | 2 | |
| 5 | 1180 | 3210 | 6.8 | −11.6 | 9.8 | 54 | |
| 6 | 1180 | 3120 | 6.1 | −11.9 | 10.2 | 64 | |
| 7 | 1180 | 3260 | 7.5 | −9.8 | 11.1 | 51 | |
| 8 | 1180 | 3180 | 6.4 | −11.6 | 9.6 | 55 | |
| 9 | 1180 | 3100 | 7.0 | −13.6 | 12.2 | 47 | |
| 10 | 1180 | 3080 | 6.1 | −14.2 | 13.5 | 53 | |
| 11 | 1180 | 3450 | 7.9 | −9.8 | 12 | 47 | |
| 12 | 1180 | 3500 | 8.5 | −10.5 | 14 | 41 | |
| 13 | 1180 | 3568 | 8.9 | −7.8 | 15 | 36 | |
| 14 | 1180 | 2100 | 9.2 | −8.2 | 2.4 | 4 | |
| 15 | 1180 | 2540 | 9.6 | −10.2 | 1.6 | — | Not sintered |
| 16 | 1180 | 2900 | 9.1 | −18.1 | 0.8 | 8 | |
| 17 | 1180 | 2500 | 8.6 | −11.3 | 0.8 | 22 | |
| 18 | 1180 | 3214 | 8.2 | −14.3 | 2.6 | 6 | |
| 19 | 1180 | 2200 | 5.2 | −8.2 | 9.5 | 15 | |
| 20 | 1180 | 2700 | 20.1 | −16.7 | 2.1 | 2 | |
| 21 | 1180 | 2100 | 9.2 | −9.6 | 4.5 | — | Not sintered |
| 22 | 1180 | 3150 | 8.2 | −11.3 | 5.2 | 21 | |
| 23 | 1180 | 2700 | 6.5 | −14.2 | 2.2 | 40 | Aging rate: −5%/decade |
| 24 | 1180 | 2050 | 10.6 | −10.5 | 0.4 | — | Not sintered |
| 25 | 1180 | 3050 | 9.8 | −17.3 | 2.2 | 5 | |
| 26 | 1180 | 3100 | 8.2 | −10.9 | 5.2 | 27 | Insulation breakdown, voltage dropped |
| 27 | 1180 | 2850 | 6.5 | −12.2 | 2.2 | 6 | |
| 28 | 1180 | 3050 | 6.8 | −12.1 | 6.5 | 22 | Insulation breakdown, voltage dropped |
| 29 | 1180 | 2950 | 6.2 | −14.3 | 3.1 | 7 | |

Note)
ST: Sintering Temperature
DC: Dielectric Constant
DF: Dielectric Failure
IR: Insulation Resistance
ML: Mean Lifetime In samples 1 to 3 in Table 3 above, sub-component contents are in the range of the invention but the contents (x and m) of main component $(Ba_{1-x}Ca_x)_m TiO_3$ are out of the range of the invention (see Tables 1 and 2). Referring to Table 3, sample 1 has a problem of life time shortened because Ca content (x) is too small. In sample 2, sintering did not take place at the experiment temperature 1,180° C. owing to a too large Ca content (x). Accordingly, IR was very low.

In samples 5 to 13 in Table 3 above, both of sub-component contents and main component $(Ba_{1-x}Ca_x)_m TiO_3$ contents are in the range of the invention (see Tables 1 and 2). As seen in Table 3, a dielectric composition comprising components and contents of the invention show a high dielectric constant of 3,000 or more without grain growth even if dielectric particles in the composition have a small size of about 300 nm. When fabricated using such composition, multilayer ceramic capacitor samples 5 to 13 have excellent TCC and thus show X5R characteristics and high reliability.

In samples 14 to 29 in Table 3 above, main component $(Ba_{1-x}Ca_x)_m TiO_3$ contents are in the range of the invention but sub-component contents are out of the range of the invention. As seen in Table 3, most of samples 14 to 29 have a dielectric constant less than 3,000. Even if the dielectric constant is 3,000 or more, at least one of other characteristics (dielectric loss, TCC, IR, mean lifetime) is inferior to those of inventive examples (samples 5 to 13).

While the present invention has been described with reference to the particular illustrative embodiments and the accompanying drawings, it is not to be limited thereto but will be defined by the appended claims. It is to be appreciated that those skilled in the art can substitute, change or modify the embodiments into various forms without departing from the scope and spirit of the present invention.

According to certain embodiments of the invention as set forth above, the dielectric ceramic composition can be sintered at a low temperature ranging from 1,150° C. to 1,200° C. at a reducing atmosphere. The dielectric ceramic composition can accomplish a high dielectric constant of 3,000 or more even if fine powder is used. Furthermore, grain growth is suppressed and dielectric constant changes little according to temperature, thereby achieving excellent thermal stability. The dielectric ceramic composition is readily applicable to ultra thin dielectric sheets having a thickness of 3 μm or less, and thus suitable for the fabrication of an ultra thin multilayer ceramic capacitor having a high capacitance.

The multilayer ceramic capacitor produced using the dielectric ceramic composition has excellent electric characteristics (e.g., IR characteristics, dielectric loss and so on) and shows high mean lifetime.

What is claimed is:
1. A dielectric ceramic composition comprising:
a main component of $(Ba_{1-x}Ca_x)_m TiO_3$; and
sub-components of $MgCO_3$, $RE_2O_3$, MO, MnO, $V_2O_5$, $Cr_2O_3$ and a sintering additive of $SiO_2$, where $RE_2O_3$ is at least one selected from the rare earth oxide group consisting of $Y_2O_3$, $Dy_2O_3$ and $Ho_2O_3$, and MO is one of Ba and Ca, wherein the dielectric ceramic composition is expressed by a following formula: $a(Ba_{1-x}Ca_x)_mTiO_3$-$bMgCO_3$-$cRE_2O_3$-$dMO$-$eMnO$-$fSiO_2$-$gV_2O_5$-$hCr_2O_3$, where a, b, c, d, e, f, g, and h satisfy following relationships: in mole fraction, $a=100$, $0.1 \leq b \leq 3.0$, $0.1 \leq c \leq 3.0$, $0.1 \leq d \leq 3.0$, $0.05 \leq e \leq 1.0$, $0.2 \leq f \leq 3.0$, $0.01 \leq g \leq 1.0$, and $0.01 \leq h \leq 1.0$, and x and m satisfy following relationships: $0.005 \leq x \leq 0.15$, and $0.995 \leq m \leq 1.03$.

2. The dielectric ceramic composition according to claim 1, wherein the $(Ba_{1-x}Ca_x)_mTiO_3$ component is provided by $(Ba_{1-x}Ca_x)_mTiO_3$ powder having a mean particle size ranging from 150 nm to 400 nm.

3. The dielectric ceramic composition according to claim 1, wherein the $(Ba_{1-x}Ca_x)_mTiO_3$ component is provided by $(Ba_{1-x}Ca_x)_mTiO_3$ powder produced by at least one selected from the group consisting of solid state mixing, hydrothermal synthesis and sol-gel method.

4. The dielectric ceramic composition according to claim 1, wherein m added with d is larger than 1.00 and smaller than 1.03.

5. The dielectric ceramic composition according to claim 1, wherein the $SiO_2$ component is provided by $SiO_2$ powder.

6. The dielectric ceramic composition according to claim 1, wherein the $SiO_2$ component is provided by $SiO_2$ sol or Si alkoxide.

7. A multilayer ceramic capacitor comprising a capacitor body having dielectric layers and internal electrodes alternating with the dielectric layers,
wherein each of the dielectric layers comprises a main component of $(Ba_{1-x}Ca_x)_mTiO_3$, and sub-components of $MgCO_3$, $RE_2O_3$, $MO$, $MnO$, $V_2O_5$, $Cr_2O_3$ and a sintering additive of $SiO_2$, where $RE_2O_3$ is at least one rare earth oxide selected from the group consisting of $Y_2O_3$, $Dy_2O_3$ and $Ho_2O_3$, MO is one of Ba and Ca, and wherein the composition of the dielectric layers is expressed by a following formula: $a(Ba_{1-x}Ca_x)_mTiO_3$-$bMgCO_3$-$cRE_2O_3$-$dMO$-$eMnO$-$fSiO_2$-$gV_2O_5$-$hCr_2O_3$, where a, b, c, d, e, f, g, and h satisfy following relationships: in mole fraction, $a=100$, $0.1 \leq b \leq 3.0$, $0.1 \leq c \leq 3.0$, $0.1 \leq d \leq 3.0$, $0.05 \leq e \leq 1.0$, $0.2 \leq f \leq 3.0$, $0.01 \leq g \leq 1.0$, and $0.01 \leq h \leq 1.0$, and x and m satisfy following relationships: $0.005 \leq x \leq 0.15$, and $0.995 \leq m \leq 1.03$.

8. The multilayer ceramic capacitor according to claim 7, wherein the internal electrodes contain a conductor of Ni or Ni alloy.

9. The multilayer ceramic capacitor according to claim 7, wherein the dielectric layers include at least 400 layers stacked one atop another.

10. The multilayer ceramic capacitor according to claim 7, wherein each of the dielectric layers has a thickness of 3 μm or less.

11. The multilayer ceramic capacitor according to claim 7, wherein each of the dielectric layers has a thickness of 0.5 μm to 3 μm.

12. The multilayer ceramic capacitor according to claim 7, wherein the $(Ba_{1-x}Ca_x)_mTiO_3$ component of the dielectric layers has a mean particle size ranging from 150 nm to 400 nm.

* * * * *